Dec. 15, 1964 H. PLÜGGE ETAL 3,161,780
PULSE DISTORTION CIRCUIT FOR PRODUCING ODD AND EVEN MULTIPLES OF A FUNDAMENTAL FREQUENCY
Filed Sept. 13, 1960
Fig. 1
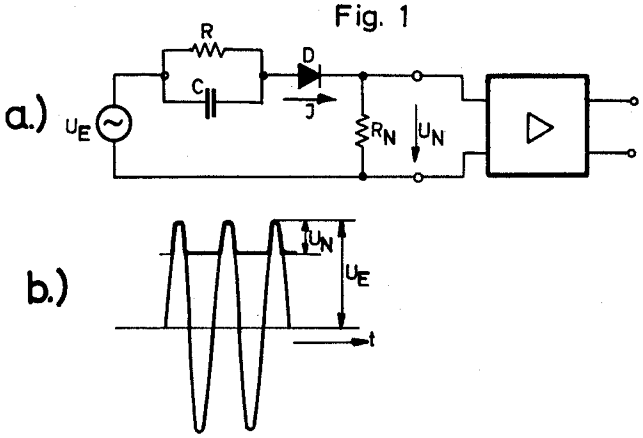
Fig. 2
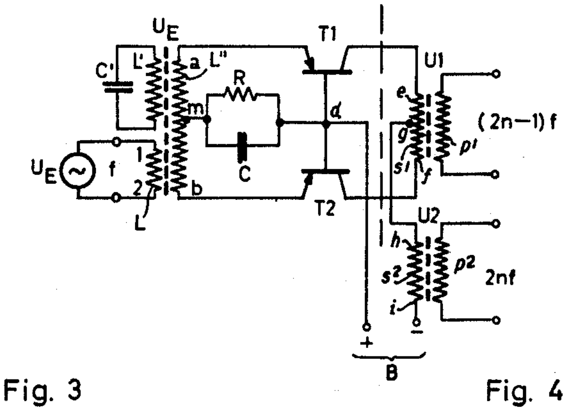
Fig. 3 Fig. 4
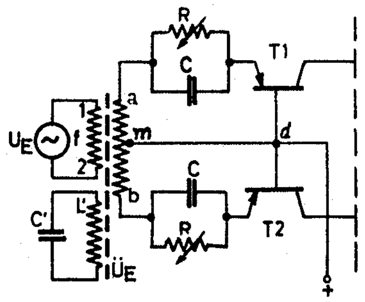
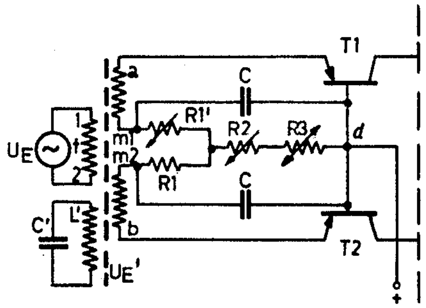

1 2

3,161,780

PULSE DISTORTION CIRCUIT FOR PRODUCING ODD AND EVEN MULTIPLES OF A FUNDAMENTAL FREQUENCY

Heinz Plügge and Erhard Steiner, Munich, Germany, assignors to Siemens & Halske Aktiengesellschaft Berlin and Munich, a corporation of Germany Filed Sept. 13, 1960, Ser. No. 55,617
Claims priority, application Germany, Sept. 29, 1959, S 65,198
4 Claims. (Cl. 307—88.5)

This invention is concerned with a pulse distorter circuit comprising transistors connected in push-pull circuits for separately producing respectively even and odd number multiples of a fundamental frequency. Devices of this kind are required particularly in the electrical communication and measuring arts.

In the carrier frequency technique there is often posed the problem of producing harmonic waves from a sinusoidal current. This is effected by means of a distorter, that is, a circuit arrangement which produces from the sinusoidal shape, by means of nonlinear switching elements, a curve shape (pulses) of identical fundamental frequency but strongly containing harmonic waves. Oversaturated iron chokes, electron tubes, diodes and of recent date transistors, are being considered as nonlinear circuit elements for use in such circuit arrangements.

Distorter circuits with oversaturated iron chokes, used until now for producing the carrier, occasion manufacturing difficulties due to the scattering of the $A_L$-value of the magnet cores. Distorters operating with diodes exhibit reduced scattering but have a very poor power factor particularly in the case of high order numbers of the desired harmonic waves. It is, therefore, so far as the power is concerned, usually more advantageous to design such distorters for low power and to dispose an amplifier in series therewith.

The use of transistors instead of diodes permits construction of a simple distorter circuit, proceeding along the principle of a distorter employing diodes, which avoids the disadvantages of the known distorters by combining shaping and amplification in one structural component or element.

The various objects and features of the invention will appear in the course of the description which is rendered below with reference to the accompanying drawing, wherein:

FIG. 1*a* is a circuit to aid in explaining a distorter operating with diodes;

FIG. 1*b* shows an example of a curve shape to be obtained;

FIG. 2 illustrates an embodiment according to the invention, employing transistors in place of diodes and an RC-member common to the transistors;

FIG. 3 represents an embodiment employing an RC-member individual to each transistor; and FIG. 4 shows an embodiment including means for adjusting the symmetry and for correcting the voltage level, respectively.

Referring now to FIG. 1*a*, the capacitor C is charged with sinusoidal current from a sinusoidal voltage source $U_E$ over the diode D and a load resistor $R_N$. The keying ratio of the pulses will increase with the discharge time constant R·C. The shaped curve form can be taken off at the load resistor $R_N$. In case harmonic waves of high order number are desired, a correspondingly high keying ratio will be required, and the efficiency of the arrangement $$\eta \sim \frac{U_N}{U_E}$$

see FIG. 1*b*, will greatly drop. In the above noted expression, $U_N$ is the voltage on the load resistor and $U_E$ is the input voltage which is to be shaped.

The invention therefore proposes to provide a shaper with transistors in push-pull circuit, wherein the input voltage which is to be shaped is placed on the primary winding of an input transformer having a particular flywheel circuit and the secondary winding of which is connected over one or two RC-members with the base-emitter paths of two push-pull connected transistors, the collectors of the two transistors being connected with the outer ends of a primary winding of a first output transformer, and a second output transformer being provided, the primary winding of which is connected to a center tap of the primary winding of the first output transformer. A simple distorter circuit is in this manner obtained, such circuit providing, with simultaneous shaping and amplification in one structural element, the advantages of a diode distorter, without any reaction of the output with respect to the keying ratio and the amplitude of the produced impulse, and adapted to give off impulses with sufficient power. The push-pull circuit makes it possible to separately obtain at the output the even and odd harmonics. The expenditure for filters is thereby, as compared with other known circuits, greatly reduced. The use of a flywheel circuit at the input transformer is moreover of particular advantage since it permits operation, for obtaining maximum impulse power, with an input voltage source of higher internal impedance.

A common RC-member may be provided in the circuit from the center tap of the secondary winding of the input transformer to the base electrodes of the two transistors, with the emitters of such transistors connected directly with the ends of such secondary winding. In accordance with another feature of the invention, the center point of the secondary winding of the input transformer can be separated to form two terminals, each of which is connected over a capacitor with the base of the respective transistors, with means including a resistor and temperature dependent resistance means likewise connected with the base electrodes of the transistors. The advantage of the corresponding arrangement is that nonsymmetries and voltage level variations can to a far reaching degree be independently equalized. The circuit may also be constructed so as to dispose an RC-member between each end of the secondary winding of the input transformer and the emitter of the respective transistor while connecting the base electrodes of the two transistors directly with a center tap of such secondary winding.

The invention will now be described more in detail with reference to FIGS. 2, 3 and 4.

The embodiment shown in FIG. 2 employs transistors instead of diodes used in FIG. 1, permitting elimination of an auxiliary power amplifier. The circuit arrangement according to FIG. 2 comprises an input transformer $U_E$ having the primary winding L, the secondary winding L″ and the tertiary winding L′, the transistors T1 and T2, and the two output transformers U1 and U2. The voltage source $U_E$ is connected in parallel with the primary winding L of the transformer $U_E$, to the terminals 1 and 2 thereof. Parallel with the tertiary winding L′ is connected the capacitor C′. The secondary winding L″ of the transformer $U_E$ is provided with the winding end *a*, winding end *b* and center tap *m*, the winding end *a* being connected with the emitter of the transistor T1 and the winding end *b* connected with the emitter of the transistor T2. The center tap *m* is connected with a parallel circuit comprising a resistor R and the capacitor C, and the other end of this parallel RC-circuit is connected with the point *d*. The secondary winding *s1* of the output transformer U1, which is likewise constructed with the winding end *e*, the winding end *f* and the center tap *g*, is connected between the two collectors of the transistors T1 and T2, with the winding end *e* connected with the collector of the transistor T1 and the winding end *f* connected with the collector of the transistor T2. The center tap *g* of the secondary winding *s1* of the transformer U1 is connected with the winding start *h* of the secondary winding *s2* of the second output transformer U2, and the winding end *i* of the secondary winding *s2* of the transformer U2 lies on the negative pole of voltage source B. The positive pole of this voltage source is connected with the point *d* of the circuit at the winding *g* of the transistor bases and the RC-circuit. In operation, the capacitor C is charged, as already explained with reference to FIG. 1, so that this parallel circuit serves for biasing the transistors. The sinusoidal input voltage of the source $U_E$ is distorted by the action of the transistors T1 and T2. The transistors T1 and T2 deliver the impulse-like charging current of the capacitor C, which is received low-ohmic at the emitters and high-ohmic at the collectors, thereby resulting in a power amplification in the ratio of load impedance to input impedance. Based upon the push-pull circuit of the transformer U1, the even-numbered harmonics of the impulse-like current in the secondary winding *s1*, will cancel each other, so that the odd-numbered harmonics can be obtained at the primary winding *p1* of the transformer U1. However, the odd numbered harmonics cancel each other in the secondary winding *s2* of the transformer U2, so that all even-numbered harmonics of the impulse-like current can be obtained at the primary winding *p2*. A considerable advantage of the circuit resides in freedom from reaction, thereby avoiding affecting the shape, keying ratio and peak current of the produced impulses, by the load impedance. The push-pull circuit permits to effect at the output a separation of the even and odd harmonics of the frequency *f*. The odd harmonics are obtained at the push-pull transformer U1 and the even harmonics are obtained at the push-pull transformer U2. A lower selection will in this manner suffice upon separation of the harmonics with the use of filters. Since the input impedance of the circuit is very low ohmic, and since the voltage source cannot as a rule deliver the high impulse peak currents, there is provided a flywheel circuit L′C′ at the input. The reactance current of this circuit, acting upon the push-pull winding *a*, *b*, is dimensioned appropriately high with respect to the impulse peak current.

FIG. 3 illustrates an embodiment wherein each transistor is provided with an RC-member which is individual thereto, the resulting circuit respectively permitting adjustment of the symmetry and of the magnitude of the impulses by adjustment of the resistors R.

The arrangement according to FIG. 4 may be employed when it is desired to equalize asymmetries and voltage level scattering to a far reaching extent independently of one another, the corresponding control being effected by separating the secondary winding of the input transformer and by placing the discharge resistors in a Y circuit. The symmetry can then be adjusted by means of the resistor R1′ and the voltage level can be corrected by means of the resistor R2. The dimensioning is appropriately effected in accordance with R2<<R1 and R1′, respectively. A temperature compensation with regard to the magnitude of the impulse peak current can be effected in simple manner by means of a thermistor R3 connected in series with the resistor R2.

The time constant of the RC-members is appropriately so dimensioned that the impulse width corresponds approximately to one half period duration of a harmonic wave which is to be preferentially produced, thus resulting in the advantage that harmonic waves with order numbers in the vicinity of the preferential harmonic waves can be taken off with optimum power.

Changes may be made within the scope and spirit of the appended claims which define what is believed to be new and desired to have protected by Letters Patent.

We claim:

1. A pulse distortion circuit for separately producing even number and odd number multiples of a fundamental frequency, comprising a push-pull input transformer having two primary windings and a secondary winding, means for connecting one of said primary windings in a flywheel circuit, means for connecting to the other primary winding the input voltage which is to be shaped, two transistors connected in push-pull circuit, means for connecting the secondary winding of said input transformer over at least one RC-member with the base-emitter paths of said transistors, a first push-pull output transformer having primary and secondary winding means, circuit means for connecting the collectors of the respective transistors with the outer ends of the primary winding of said first output transformer, a second output transformer having a primary and a secondary winding, and circuit means for connecting the primary winding of said second output transformer to a center tap of the primary winding of said first output transformer.

2. A circuit according to claim 1, wherein the RC-member is common to said transistors and is connected between the base electrodes of said transistors and a center tap of the secondary winding of said input transformer.

3. A circuit according to claim 1, wherein the secondary winding of said input transformer is centrally subdivided to form two central terminals therefor, said means for connecting the secondary winding of said input transformer with the base-emitter paths of said transistors, comprising a capacitor for each terminal extending between the latter and the base electrodes of said transistors, a resistor connected to each of said terminals, and circuit means including further resistors for connecting said first named resistors with said base electrodes.

4. A circuit according to claim 1, wherein said means for connecting the secondary winding of said input transformer with the base-emitter paths of said transistors, comprises an RC member disposed between the emitter of each transistor and an outer end of the secondary winding of said input transformer, and means for connecting a center tap of such secondary winding directly with the base electrodes of said transistors.

References Cited by the Examiner

UNITED STATES PATENTS

| | | | |
|---|---|---|---|
| 1,592,937 | 7/26 | Jammer | 331—76 |
| 1,931,870 | 10/33 | Kramar et al. | 321—65 X |
| 2,146,091 | 2/39 | Peterson | 328—17 |
| 2,652,460 | 9/53 | Wallace | 307—88.5 |
| 2,913,670 | 11/59 | Laine | 331—77 X |

FOREIGN PATENTS 272,426 3/51 Switzerland.

OTHER REFERENCES

Hurley: Junction Transistor Electronics, Wiley & Sons, N.Y., 1958 (page 185 relied on).

ARTHUR GAUSS, *Primary Examiner.*

GEORGE N. WESTBY, *Examiner.*